United States Patent [19]

Nozaki et al.

[11] Patent Number: 5,279,845
[45] Date of Patent: * Jan. 18, 1994

[54] KONJAK-ADDED FOODSTUFFS AND PROCESS OF MAKING

[75] Inventors: Hisashi Nozaki; Seiya Sakurai, both of Saitama, Japan

[73] Assignees: Kabushiki Kaisha Kibun, Tokyo; Kabushiki Kaisha Kyowashokuhin, Saitama, both of Japan

[*] Notice: The portion of the term of this patent subsequent to Oct. 16, 2007 has been disclaimed.

[21] Appl. No.: 8,079

[22] Filed: Jan. 22, 1993

Related U.S. Application Data

[63] Continuation of Ser. No. 426,242, Oct. 25, 1989, abandoned, which is a continuation-in-part of Ser. No. 229,174, filed as PCT/JP87/00881, on Nov. 13, 1987, Pat. No. 4,963,383.

[30] Foreign Application Priority Data

Oct. 31, 1988 [JP] Japan .............................. 63-273171

[51] Int. Cl.$^5$ .............................................. A23L 1/05
[52] U.S. Cl. .................................... 426/573; 426/105; 426/622; 426/641; 426/643; 426/656
[58] Field of Search ............... 426/573, 641, 656, 105, 426/622, 643

[56] References Cited

U.S. PATENT DOCUMENTS

| | | |
|---|---|---|
| 4,582,714 | 4/1986 | Ford et al. . |
| 4,652,455 | 3/1987 | Sugino et al. . |
| 4,652,455 | 3/1987 | Sugino et al. . |
| 4,659,388 | 4/1987 | Innami et al. . |
| 4,676,976 | 6/1987 | Toba et al. .......................... 426/573 |
| 4,741,907 | 5/1988 | Furuhashi ............................ 426/90 |
| 4,746,528 | 5/1988 | Prest et al. ......................... 426/573 |

FOREIGN PATENT DOCUMENTS

| | | |
|---|---|---|
| 57-122753 | 7/1982 | Japan . |
| 60-141250 | 7/1985 | Japan . |
| 60-227657 | 11/1985 | Japan . |
| 62-14751 | 6/1987 | Japan . |
| 62-74255 | 9/1987 | Japan . |
| 62-74256 | 9/1987 | Japan . |
| 62-83855 | 9/1987 | Japan . |
| 63-68054 | 3/1988 | Japan . |
| 63-71158 | 3/1988 | Japan . |
| 8803760 | 11/1986 | PCT Int'l Appl. . |
| 2100967 | 1/1983 | United Kingdom . |
| 2204474 | 11/1988 | United Kingdom ............... 426/573 |
| 2206027 | 12/1988 | United Kingdom . |

OTHER PUBLICATIONS

Patent Abstracts of Japan, vol. 7, No. 219 (C-188)[1364], Sep. 29, 1983.
Patent Abstracts of Japan vol. 12, No. 297 (C-519)[3144], Aug. 12, 1988.
Patent Abstracts of Japan, vol. 13, No. 402 (C-633)[3750], Sep. 6, 1989.

*Primary Examiner*—Helen F. Pratt
*Attorney, Agent, or Firm*—Browdy and Neimark

[57] ABSTRACT

The present invention relates to foodstuffs which are prepared by adding konjak paste having a pH value of 9.0 to 10.3 and relates to the process for preparing the same.

18 Claims, No Drawings

KONJAK-ADDED FOODSTUFFS AND PROCESS OF MAKING

This is a continuation of parent co-pending application Ser. No. 07/426,242 now abandoned filed Oct. 25, 1989, itself a continuation-in-part of its parent co-pending application Ser. No. 229,174, filed as PCT/JP87/00881, on Nov. 13, 1987, now U.S. Pat. No. 4,963,383.

BACKGROUND OF THE INVENTION

1. Field of the Invention

The present invention relates to a process for preparing foodstuffs to which konjak is added.

More particularly, the present invention relates to a process for preparing hamburgers or the like to which konjak is added without injuring the taste of the resuffant foodstuffs.

According to the present invention, konjak can be added to foodstuffs without injuring their taste, by using konjak paste prepared in a pH range of from 9.0 to 10.3, preferably a pH range of 9.5 to 10.2. Such a prepared konjak additive greatly contributes to rendering foodstuffs low calorie.

2. Statement of the Prior Art

Konjak has been utilized as food from antiquity. In recent years, attention has been focused on its usefulness as a dietary product because of its non-calorie property and its ability to add dietary fibers.

However, until recently konjak has been used mostly in a board-like form provided as daily food but it has been difficult to make use of konjak as a material for processed foodstuffs, for example, to add konjak to other foodstuffs thereby to impart its peculiar texture to the foodstuff, to improve physical properties of foodstuffs or to use as a "liaison" or for calorie control.

The development of technology for adapting konjak raw materials such as konjak powders, etc. for processed foodstuff materials or foodstuff additives has heretofor been retarded.

Thus, in a conventional method for preparing konjak, 900 to 1200 liters of water is added to about 30 kg of konjak powder, the resulting mixture is swollen to make konjak paste and 3 to 6% of lime is then added to and mixed with the konjak paste.

Subsequently, the mixture is filled up in a container, a molding box or the like and heated at a temperature of about 80° C. for about 60 minutes to obtain the conventional konjak product in board form. This process has been used from antiquity.

Therefore, in the case of using konjak powders as food materials for other processed foodstuffs, etc., there have been adopted techniques of finely dividing konjak into powder and adding such fine konjak powder, or swelling konjak in water and adding the konjak as konjak paste, or adding lime to konjak and adding the resulting konjak paste, etc.

However, these techniques involve a problem that konjak mannan is not gelled even at the stage of final products so that the paste state remains, a problem that a smell of slaked lime used as a solidifying agent for konjak remains, a problem that taste is deteriorated because the pH is inclined toward an alkaline side, and the like.

Accordingly, the amount of konjak to be added has been greatly limited under the actual situation though it is wished to add a much greater amount of konjak for purposes of improving physical properties or controlling the calories of the base foodstuff.

As a result of extensive investigations to add konjak to foodstuffs without injuring the taste of such foodstuffs, the present inventors have found that by adjusting a pH value of konjak paste in a range of from 9.0 to 10.3, the alkali taste or paste-like texture can be prevented.

SUMMARY OF THE INVENTION

The present invention is concerned with a process for preparing konjak-added foodstuffs which comprises incorporating into food raw materials konjak paste prepared to have a pH range of from 9.0 to 10.3, preferably 9.5 to 10.2 and processing the mixture.

The thus-prepared konjak paste is allowed to stand at 20° to 25° C. (i.e. it is unheated) for at least 1.5 hours, preferably for 2 to 4 hours, after the above-mentioned pH adjustment, and is then used.

DETAILED DESCRIPTION OF THE PREFERRED EMBODIMENTS

Next, representative embodiments of the present invention for preparing pH-controlled konjak paste are described below.

(1) To konjak powder is added a 20 to 40-fold amount of water to swell and dissolve the konjak powders in water. Basic amino acids and basic salts are added to the resulting konjak paste. The mixture is thoroughly mixed. Alternatively;

(2) Basic amino acids and basic salts are dissolved water in an amount of 20 to 40 times that of konjak powder and konjak powder is swollen and dissolved in in the resulting solution. Alternatively, (3) Necessary amounts of basic amino acids and basic salts are previously mixed with konjak powder and a 20 to 40-fold amount of water is added to the resulting powdery mixture to swell and dissolve konjak powder, the basic amino acids and basic salts therein.

In a manner as described above, konjak powder or flour mixed with water and alkali agents are swollen and dissolved to prepare konjak paste having pH of 9.0 to 10.3, preferably pH of 9.5 to 10.2.

Examples of the alkali agent which can be used in the present invention are, as the basic amino acid, arginine, histidine, lysine, citrulline, ornithine, etc. Arginine and lysine are particularly preferred.

Any basic salts are usable so long as they are used for foodstuffs but basic phosphates and organic acid salts are preferred. For example, sodium carbonate, calcium carbonate sodium bicarbonate, disodium phosphate, trisodium phosphate, dicalcium phosphate, tripotassium phosphate, sodium polyphosphate, sodium citrate, sodium lactate, etc. are preferably used.

In order to give a buffering effect, acids such as citric acid, lactic acid, etc. or acidic salts such as sodium dihydrogenphosphate, potassium dihydrogenphosphate, etc. may also be used in a suitable combination to finally adjust pH to 9.0 to 10.3, preferably 9.5 to 10.2.

According to the present invention, the alkali agent is chosen from the basic salts for foodstuff additives described above and is used singly or in combination.

Since the pH of konjak paste varies depending upon kind of the alkali agent, it is necessary that an amount required for the desired pH be previously determined by preparing konjak paste using an alkali agent.

In the present invention, 1 to 50% of konjak paste with a pH in a range of 9.0 to 10.3 is incorporated into raw food materials and the mixture is processed, whereby foodstuffs free of deterioration in taste due to alkali and substantially free of konjak-like texture or konjak paste-like texture can be obtained. Thus, excellent low calorie foodstuffs can be provided according to the present invention.

In the present invention, approximately 1 to 50% of konjak paste is added to raw food material such as meat for hamburger, meat for sausage, fish meat, etc. The mixture is then processed by heating, steaming, etc. to prepare konjak-added foodstuffs. In the following examples, food products are made containing on the order of about 20-30% of water swollen konjak paste.

The konjak paste controlled to the pH range in accordance with the present invention can be added to various foodstuffs to add bulk whereby for a given quantity of combined foodstuff the calorie content is reduced. In addition thereto, the konjak paste can be added to marine processed foodstuffs or meat processed foodstuffs to improve their taste, texture, water-retaining properties, etc., or added to flour to make Chinese noodles Japanese noodles etc. to improve texture and other physical properties, alternatively, the konjak paste may be added to flour to make bread, cookies etc. to improve the texture, swellability and other physical properties.

Next, test examples and examples of the present invention are given below.

TEST EXAMPLE

To 5.6 g of konjak powder ws added 200 ml of sodium carbonate solution in a 0 to 0.5% concentration. While stirring, konjak was swollen and the mixture was allowed to stand at room temperature for 2 hours to swell the konjak completely. The resulting alkaline konjak paste, 60 g, was mixed with 140 g of minced beef and, 50 g of the mixture was shaped into a circle of a 8 cm diameter. A part of this hamburger patty was baked, on a pan, as it was and another part was baked after freezing at −20° C. Physical properties and taste of the hamburger were than examined. At the same time, the pH of the alkaline konjak paste and hamburger patty was determined.

The results are shown in Table 1 below.

TABLE 1

Results of pH Measurement and Physical Properties and Taste of Patty

| Concentration of Sodium Carbonate | pH of Alkaline Konjak Paste | pH of Hamburger Patty | Physical Properties and Taste When Baked As It Was | Physical Properties and Taste When Baked After Freezing |
|---|---|---|---|---|
| 0 | 6.60 | 6.10 | x Konjak paste is not solidified but strong paste like taste. | x Konjak paste is not solidified but strong paste like taste. |
| 0.1 | 8.92 | 6.23 | x Same as above | x Same as above |
| 0.15 | 9.36 | 6.30 | x Same as above | o Konjak paste is solidified and has good texture. |
| 0.2 | 9.62 | 6.36 | Konjak Δ paste is not solidified but weak paste like taste. | o Same as above |
| 0.25 | 9.78 | 6.46 | o Konjak paste is solidified and has good texture. | o Same as above |
| 0.3 | 9.94 | 6.47 | o Same as above | o Same as above |
| 0.35 | 10.05 | 6.59 | o Same as above | o Same as above |
| 0.4 | 10.11 | 6.66 | o Same as above | o Same as above |
| 0.45 | 10.14 | 6.88 | Konjak Δ paste | Konjak Δ paste |
| 0.5 | 10.30 | 6.94 | is solidified and has good texture. Somewhat weak alkali taste. x Same as above | is solidified and has good texture. Somewhat weak alkali taste. x Same as above |
| 0.6 | 10.40 | 7.00 | x Alkali taste and unpleasant odor. | x Alkali taste and unpleasant odor. |
| 0.8 | 10.50 | 7.21 | x Same as above | x Same as above |
| 1.0 | 10.60 | 7.44 | x Same as above | x Same as above |

Beef alone: pH 6.01

EXAMPLE 1

To 30 g of konjak powder was added 1000 ml of 0.3% sodium carbonate solution. While stirring, the konjak was swollen and the mixture was allowed to stand at room temperature for further 2 hours to swell konjak completely. The pH of the konjak paste was 9.9. To 200 g of the resulting alkaline konjak paste was added 500 g of minced beef. The mixture was well mixed and shaped into 60 g of hamburger patty of a 8 cm diameter. The hamburger patty had good texture.

This hamburger patty was baked for tasting. It was delicious hamburger free of unpleasant odor and free of konjak-like texture.

EXAMPLE 2

To 28 g of konjak powder was added 1000 ml of 0.2% sodium carbonate solution. While stirring, konjak was swollen and the mixture was allowed to stand at room temperature for further 2 hours to swell konjak completely. The pH of the konjak paste was 9.6. To 300 g of the resulting alkaline konjak paste was added 700 g of salmon fish meat. The mixture was well mixed. After shaping into a piece of 5 cm φ 40 g, the piece was covered with a batter obtained by dissolving wheat powder in water and then with bread crumbs, which was frozen at −25° C. overnight in a refrigerator. It was a soft salmon fry free of unpleasant odor and free of dry texture.

EXAMPLE 3

Minced pork, 1750 g, 100 g of lard and 52 g of table salt were mixed and stirred with a cutting mixer and 12 g of sugar, 7 g of sodium glutamate, 70 g of starch, 35 g of a smoking solution, 18 g of spice mixture (mixture of pepper, paprika, coriander, ginger, cinnamon, sage, onion, mace) and 350 g of ice water were further added to the mixture. To the resulting meat mixture was added 600 g of alkaline konjak paste as prepared in Example 1. The mixture was further mixed and stirred and packed in a collagen casing for Vienna sausage. Boiling with hot water of 80° C. for 20 minutes gave Vienna sausage. The sausage was free of unpleasant odor and had soft texture.

While the invention has been described in detail and with reference to specific embodiments thereof, it is apparent to one skilled in the art that various changes and modifications can be made therein without departing from the spirit and the scope of the invention.

What is claimed is:

1. A foodstuff containing a mixture of caloric food and a non-preheated non-caloric food said non-caloric food consisting essentially of
   an amount sufficient of a swollen konjak paste to enhance water-retention properties of said foodstuff, said amount being in the range of 1–50%,
   said swollen konjak paste being producible by mixing konjak flour, an amount of water sufficient to cause said konjak flour to swell and dissolve, and a basic compound selected from the group consisting of a basic amino acid, a basic salt, and a mixture thereof, and adjusting the pH of the resulting mixture to a range of 9.0 to 10.3,
   said mixture having been formed prior to any substantial heating of said swollen konjak paste.

2. A foodstuff according to claim 1 comprising about 20–30% of said swollen konjak paste.

3. A foodstuff according to claim 1 wherein said caloric food is ground meat.

4. A foodstuff according to claim 1 wherein said caloric food is ground fish.

5. A foodstuff according to claim 1 wherein said caloric food is flour.

6. A foodstuff in accordance with claim 1 in the form of a hamburger patty comprising approximately two parts of said swollen konjak paste and five parts of minced beef.

7. A foodstuff containing a mixture of a caloric food and a non-preheated non-caloric food, said non-caloric food consisting essentially of an amount sufficient of a water swollen konjak paste to enhance water-retention properties of said foodstuff, said amount being in the range of 1–50%, said swollen konjak paste consisting essentially of konjak flour mixed with water and a basic compound selected from the group consisting of a basic amino acid, a basic salt, and a mixture thereof, said water swollen konjak paste having a pH in the range of 9.0 to 10.3, said mixture having been formed prior to any heating of said swollen konjak paste.

8. A konjak-added food or food material according to claim 7 comprising about 20–30% of said water swollen konjak paste.

9. A foodstuff according to claim 7 wherein said caloric food is ground meat.

10. A foodstuff according to claim 7 wherein said caloric food is ground fish.

11. A foodstuff according to claim 7 wherein said caloric food is flour.

12. A foodstuff according to claim 7 in the form of sausage, comprising minced pork and spices, and packed in a collagen casing.

13. An uncooked, chilled konjak-added food or food material, produced according to the process of
   (a) forming an unheated konjak paste by mixing konjak flour, an amount sufficient of water to cause the konjak flour to swell and dissolve, and a basic amino acid, a basic salt, or a mixture thereof; adjusting the pH of the resulting mixture to a range of 9.0 to 10.3; and leaving the pH adjusted mixture to stand to cause the konjak flour to swell sufficiently;
   (b) incorporating the unheated konjak paste into a food material to provide a mixed foodstuff; and
   (c) chilling the konjak-added mixed foodstuff.

14. A foodstuff according to claim 13 wherein said caloric food is ground meat.

15. A foodstuff according to claim 13 wherein said caloric food is ground fish.

16. A foodstuff according to claim 13 wherein said caloric food is flour.

17. A foodstuff according to claim 13 in the form of a salmon patty comprising three parts of said water swollen konjak paste and seven parts of salmon fish meat, and coated with bread crumbs.

18. A konjak-added food or food material, produced according to the process of
   (a) forming an unheated konjak paste by mixing konjak flour, an amount sufficient of water to cause the konjak flour to swell and dissolve, and a basic amino acid, a basic salt, or a mixture thereof; adjusting the pH of the resulting mixture to a range of 9.0 to 10.3; and leaving the pH adjusted mixture to stand to cause the konjak flour to swell sufficiently;
   (b) incorporating the unheated konjak paste into a food material to provide a mixed foodstuff; and
   (c) cooking the konjak-added mixed foodstuff.

* * * * *